United States Patent
Reitmaa et al.

(10) Patent No.: US 6,424,843 B1
(45) Date of Patent: Jul. 23, 2002

(54) MULTI-FUNCTION TELECOMMUNICATION DEVICE

(75) Inventors: Ilpo Reitmaa, Helsinki; Hannu Nieminen, Lempäälä; Jyrki Kimmel, Tampere; Kirsi Tappura, Tampere; Mika Väisänen, Tampere; Timo Kolehmainen, Oulu, all of (FI)

(73) Assignee: Nokia Oyj, Espoo (FI)

( * ) Notice: Subject to any disclaimer, the term of this patent is extended or adjusted under 35 U.S.C. 154(b) by 0 days.

(21) Appl. No.: 09/403,458
(22) PCT Filed: Apr. 22, 1998
(86) PCT No.: PCT/FI98/00359
§ 371 (c)(1),
(2), (4) Date: Apr. 5, 2000
(87) PCT Pub. No.: WO98/48548
PCT Pub. Date: Oct. 29, 1998

(30) Foreign Application Priority Data

Apr. 22, 1997 (FI) .................................................. 971708

(51) Int. Cl.⁷ .................................................. H04B 1/38
(52) U.S. Cl. .................. 455/566; 455/550; 379/433.04
(58) Field of Search .......................... 455/575, 90, 66, 455/351, 347, 566, 550; 379/428.01, 428.02, 433.01, 433.04

(56) References Cited

U.S. PATENT DOCUMENTS

| 5,048,077 A | 9/1991 | Wells et al. |
| 5,077,784 A | 12/1991 | Fujita et al. |
| 5,251,333 A | 10/1993 | Tsook |
| 5,414,444 A | 5/1995 | Britz |
| 5,491,507 A | 2/1996 | Umezawa et al. |
| 5,550,754 A | 8/1996 | McNelley et al. |
| 5,602,566 A | 2/1997 | Motosyuku et al. |

FOREIGN PATENT DOCUMENTS

| EP | 0294518 A2 | 12/1988 |
| EP | 0588210 A1 | 3/1994 |
| EP | 0603013 A1 | 6/1994 |
| EP | 0685953 A1 | 12/1995 |
| EP | 0715441 A1 | 6/1996 |
| WO | WO 93/14589 | 7/1993 |
| WO | WO 96/35288 | 11/1996 |

*Primary Examiner*—Doris H. To
(74) *Attorney, Agent, or Firm*—Perman & Green, LLP (57) ABSTRACT

The telecommunication device comprises a speaker (32) and a microphone (33) in order to use the telecommunication device as a telephone. Further it comprises a camera (91, 1101) having a certain photographing direction, and a display (38, 1102) having a certain displaying direction, in order to use the telecommunication device as an image generating means. The photographing direction is substantially different from the displaying direction.

18 Claims, 8 Drawing Sheets

MULTI-FUNCTION TELECOMMUNICATION DEVICE

The invention relates generally to audio-visual communications and data processing devices. The invention relates particularly to the implementation of versatile control, display and communications functions in a small-sized device of this kind.

Figure 1:
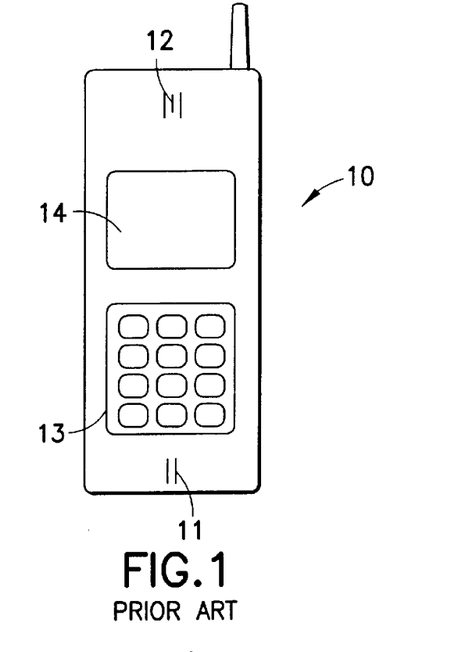
FIG. 1 shows a prior art mobile phone.

The mobile phone 10 according to FIG. 1 is primarily intended for two-way communication of speech, and for this purpose the mobile phone has a microphone 11 and a speaker 12. For controlling the operation of the device it has a keyboard 13 and for the transfer of information to the user the device has a display 14. In the common operating position during a telephone call the user holds the mobile phone according to FIG. 1 next to his head so that the speaker 12 is located at the ear and the microphone 11 is as close to the mouth as possible. Due to the operating position during a call it is practically impossible to use the keyboard 13 for entering input data and to read information in the display 14. However, in some cases the user would like to use the keyboard 13 and/or the display 14 also during a call, whereby a prior art mobile phone must be removed from its position next to the head so that it is located in front of the face. When the speaker 12 is removed farther away from the user's ear the sound reproduced by the speaker is heard more weakly by the user, and correspondingly when the microphone 11 gets farther away from the user's mouth it will make a poorer recording of the user's speech.

Figure 2:
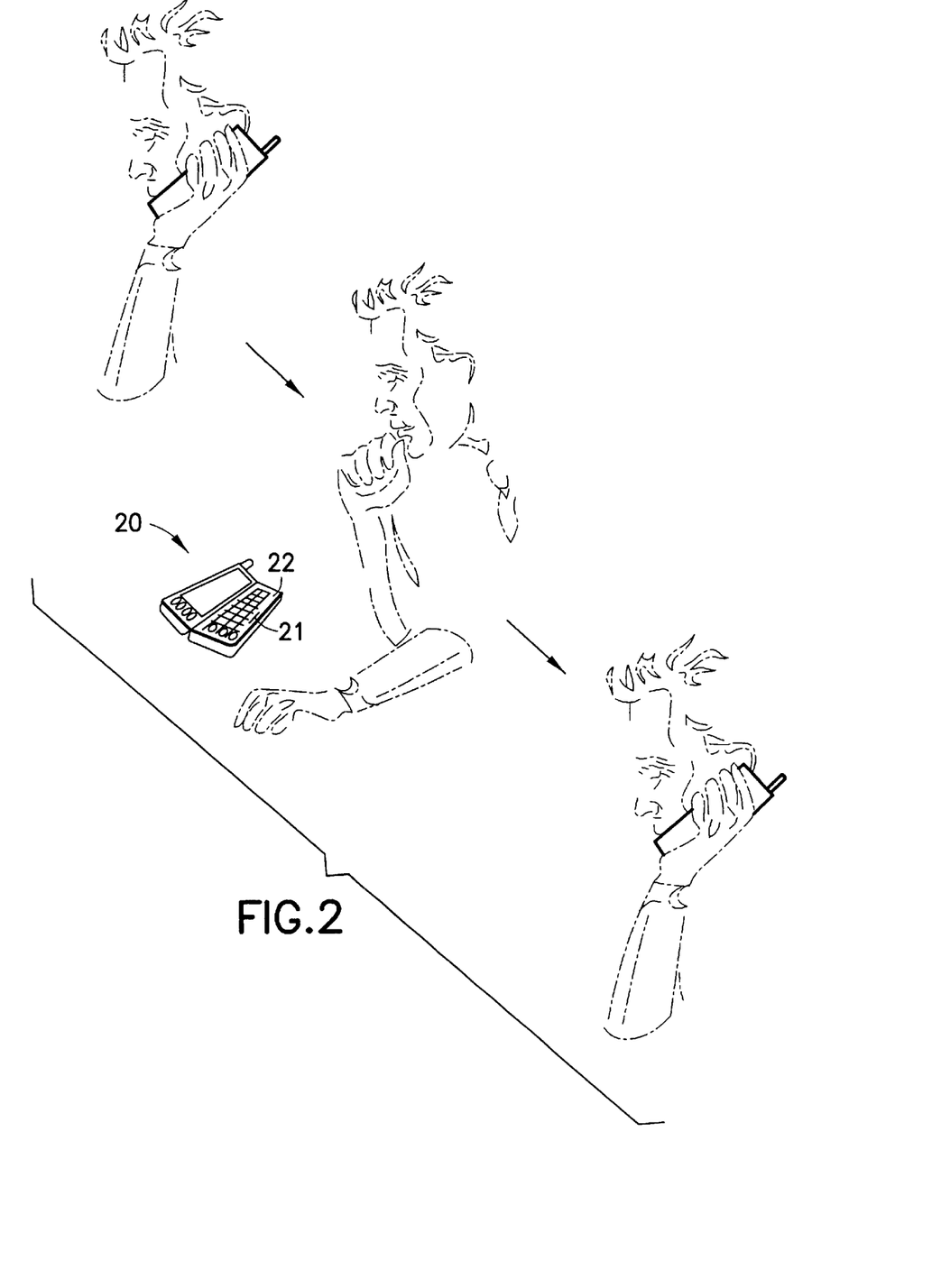
FIG. 2 shows a prior art dual-function telecommunication device.

In prior art there is also known a dual-function telecommunication device 20, illustrated in FIG. 2; in the middle of a call the user can lift the device in the opened state in front of him, whereby a switch (not shown in the figure) in the device automatically switches on a higher volume for the sound reproduction of the speaker 21 and a higher recording sensitivity of the microphone 22, which partly obviates the problem presented above. However, then the user's privacy suffers, because also persons in the vicinity can hear the sounds from the speaker and because the user usually must speak louder than if the microphone would be really close to the mouth. Moreover, a change from the talking operation to the keyboard operation and vice versa can be felt cumbersome by the user.

A number of developed mobile phones are known from the publication WO 96/35288. In said publication it is proposed among other things that the mobile phone can be provided with an additional display which is such that the image generated by it is located in the user's field of vision even when the user holds the mobile phone in the common operating position on one side of his head. Said additional display can be located at the bottom end of the mobile phone, whereby it is as such in the user's field of vision, or the mobile phone can contain (most preferably foldable) optics, with the aid of which the user sees the image generated by the additional display reflected via different mirrors and/or lenses. The publication WO 96/35288 further proposes that a mobile phone can be provided to operate as a video conference means, whereby a camera integrated in the mobile phone or in an accessory used together with the mobile phone photographs the user of the mobile phone and transmits the picture it has taken via a radio connection to the device of the user's talking partner. Correspondingly the additional display of the mobile phone can then display a picture of the user's talking partner generated in a corresponding way.

The object of the present invention is to present a communications and data processing device whose functions during operation can be controlled in an easier way than in prior art devices. An object of the invention is also to present a communications and data processing device which has more versatile functions than prior art telecommunication devices.

The objects of the invention are attained by providing a telecommunication device of the mobile phone type with a camera and a display which are mutually arranged so that the display can be used as a viewfinder of the camera.

The communications and data processing device according to the invention which comprises     a speaker and a microphone in order to use the telecommunication device as a telephone, and     a camera having a certain photographing direction, and a display having a certain displaying direction, in order to use the telecommunication device as an image generating means, is characterised in that said photographing direction is substantially different from said displaying direction.

The user of an electronic device is able to give control instructions to the device by moving the parts of his body in quite different ways, if the response about the effect of the movements required by a good motion co-ordination is visually conveyed to the user. A communications and data processing device according to the invention has a display which the user in the first preferred embodiment of the invention can view also when the device is raised close to the ear next to the head. According to the first embodiment of the invention the device further contains some kind of a device which converts the motions of the user's fingers, hand and/or head, and/or changes in the position of the device, into display control instructions, in other words into instructions which act on the information which is processed and presented in the display. For instance, the user can move the cursor in the display by rolling the tracker ball of a ball mouse included in the communications and data processing device by the fingers holding the telecommunication device. Alternatively, the user can move a cursor in the display by touching a touch pad in the communications and data processing device. Alternatively or in addition the user can pan the image visible in the display by turning his head and the communications and data processing device kept on one side of his head, as if he would look around him when he talks in the telephone.

In the following the device according to the invention is for short called a telecommunication device. In order to realise a display during operation the tele-communication device according to the invention comprises an optical arrangement, with which the display is made visible in the user's field of vision, even if the proper telecommunication device would be kept on one side of the head.

In a second embodiment of the invention the telecommunication device also includes a digital camera. In order to facilitate photographing the image produced by the camera can be directed via the display into the user's field of vision, whereby the user can use the display as a viewfinder of the camera. A display used in this way can be the only display of the telecommunication device, or the telecommunication device can contain a particular display to be used as a viewfinder. If the camera has been directed so that in a normal operating position its photographing direction is the same as the direction of the user's eye, then the image generated by the camera can be used to realise an "augmented reality" effect, whereby the camera image covers a certain sector of the user's field of vision and displays and/or communicates messages concerning something about objects in this sector which the user otherwise would not see with the naked eye. The camera can for instance photograph at a wavelength which differs from that of visible light. If the camera operates at the infrared wavelength, then the telecommunication device can contain a lamp part comprising infrared light emitting diodes, with which the object to be photographed can be illuminated by the user during photographing.

The invention is described in more detail below with reference to preferred embodiments presented as examples and to the enclosed figures, in which.

In connection with the above description of prior art reference was made to the FIGS. 1 and 2, so that in the following description of the invention and its preferred embodiments reference is mainly made to the FIGS. 3a to 11. The same reference numerals are used for corresponding parts in the figures.

Figure 3A:
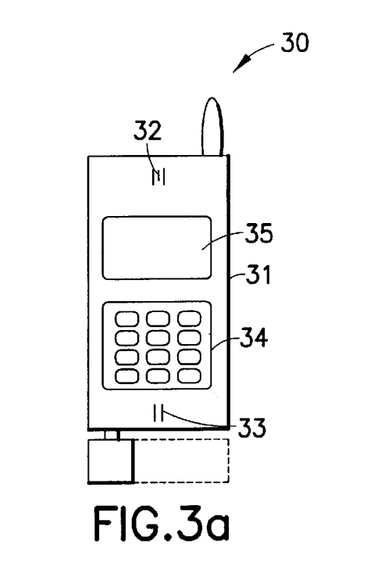
FIGS. 3a to 3d show a telecommunication device according to the invention.
Figure 3B:
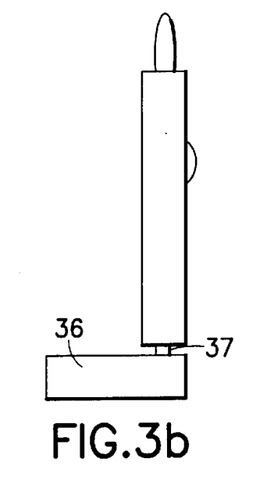
Figure 3C:
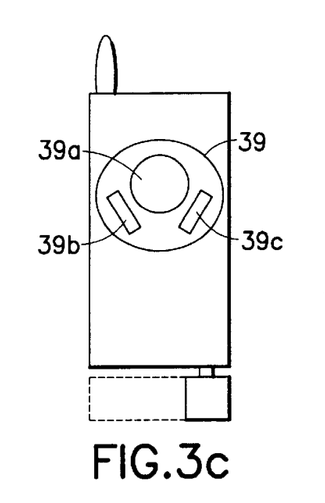
Figure 3D:
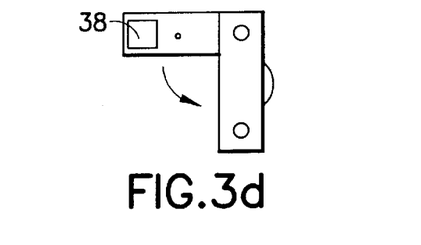

The FIGS. 3a to 3d show a telecommunication device 30 according to a first embodiment of the invention as seen from different directions. The device has a frame part 31 which resembles a prior art mobile phone and comprises a speaker 32, a microphone 33, and a keyboard 34. The frame part can also comprise a first display 35, which is most preferably a liquid crystal display realised by dot matrix techniques known per se. Further the device has a display part 36 which is fastened to the frame part 31 by a rotating joint 37. The display part 36 contains a second display 38 whose technical implementation is later described in more detail. The display 38 can be the only display of the telecommunication device if the frame part 31 has no display. In the FIGS. 3a to 3d the display part 36 is shown in a position turned to one side, which could be called the operating position. The rotating joint 37 is realised so that the display part 36 can be turned also into the so called transport position, which in the FIGS. 3a and 3c is shown by a broken line and in which it forms a natural extension of the form of the frame part 31. FIG. 3d illustrates by an arrow how the device is turned into the transport position.

Figure 4:
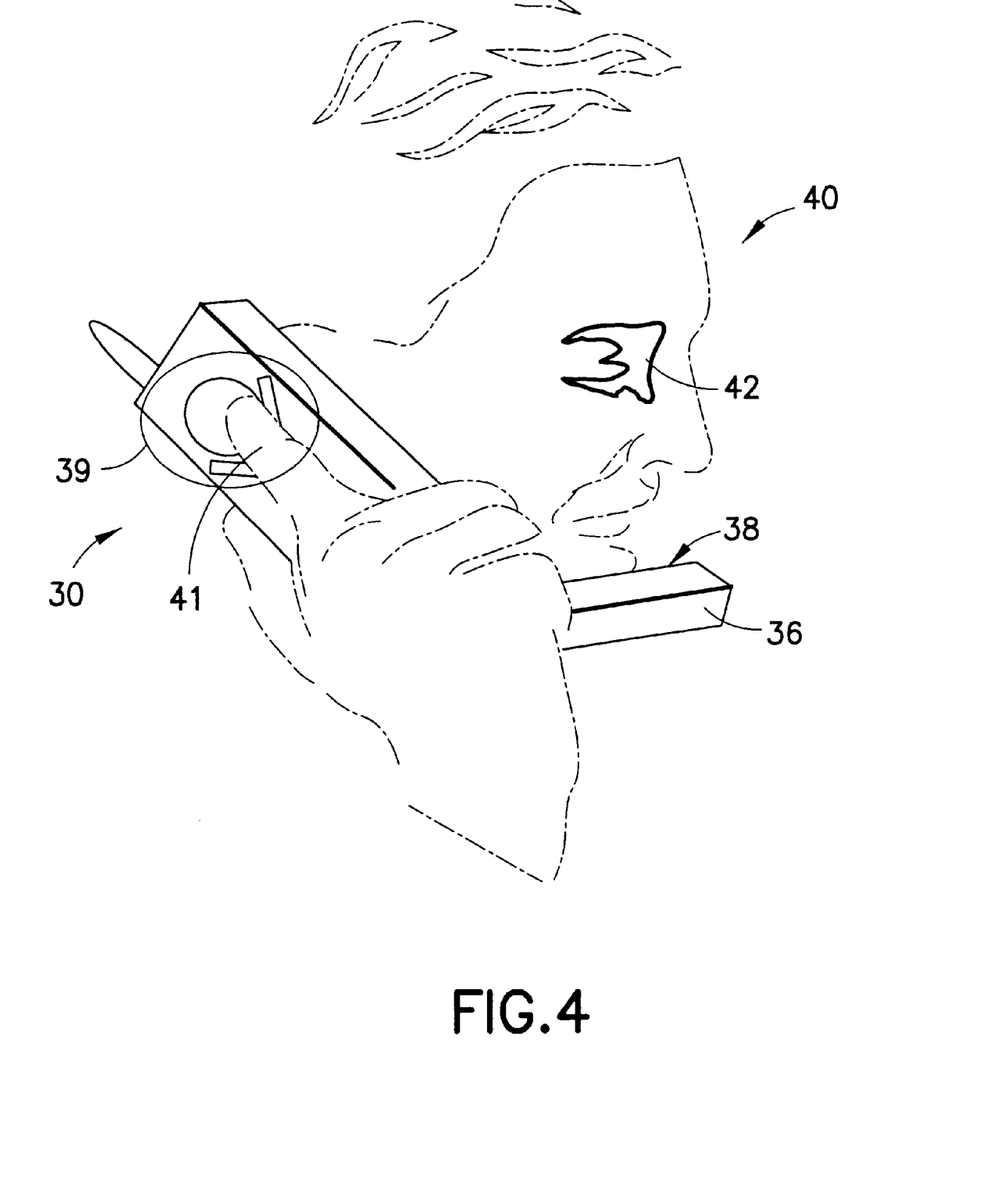
FIG. 4 shows the operation of the telecommunication device according to the FIGS. 3a to 3d.

On the opposite side of the frame part 31 as seen from the speaker 32 there is according to the FIG. 3c a ball mouse 39 which comprises a tracker ball 39a and buttons 39b and 39c. FIG. 4 shows the operation of the telecommunication device according to FIGS. 3a to 3d, and there is shown the purpose of the placement of the display part 36 and the ball mouse 39. The user 40 holds the telecommunication device 30 with one hand at one side of his head, as a prior art mobile phone. Then the speaker, which is not shown in FIG. 4, is against the ear of the user 40. The forefinger 41 of the user's hand holding the telecommunication device is at the ball mouse 39, and the display part 36 is close to the user's right cheek, so that the second display 38 is in the field of vision of the user's right eye 42. During the use of the telecommunication device the user is able to use the ball mouse 39 for entering control instructions and for getting responses about the effect of the control instructions via the display 38. If the user does not want to use the display 38 during a call he can simply turn the display part 36 into the transport position, even in the middle of a call, and use the telecommunication device 30 in the manner of a conventional mobile phone. Due to the established use of known telephone devices the operating position of the FIG. 4 is advantageous in that it is a so called socially accepted position; in other words, in this position the user does not attract embarrassing attention in his environment.

In order to enable the user to hold the telecommunication device in the position according to FIG. 4 the frame part must be designed so that it can be firmly held in one hand and so that when the user's grip is natural, the speaker, the microphone and the display part are correctly located in relation to the user's head. Generally this is realised in the most practical way so that the frame part is elongated, whereby it has two ends. The speaker is located in that part which is at the first end of the frame part and the microphone and the display part are located in that part which is at the second end of the frame part. The distance between the speaker and the microphone is of the same order as the distance between the human ear and mouth, i.e. most preferably at least 5 cm, but at most 15 cm. The frame part may be foldable, whereby the distance requirement is met only when the frame part is folded out into a certain open position. Correspondingly, the distance between the speaker and the display contained in the display part is of the same order as the distance between the human ear to the field of vision of the eye closer to this ear, or most preferably at least 5 cm but at most 15 cm. In the elongated design of the frame part there is sufficiently of firm surface between the ends against which the user's fingers are pressed in order to have a good grip. Further, regarding the location of the components the telecommunication device is most preferably flat, which means that in one of the directions perpendicular to the longitudinal direction of the telecommunication device the device extends substantially farther than in other directions substantially different from this one direction. Then the telecommunication device has two opposite wide side surfaces, and the speaker is located on one of these wide side surfaces and the ball mouse or corresponding control device is located on the other wide side surface. As they are three-dimensional bodies they certainly are generally located mainly within the device, but because those parts of the speaker, ball mouse etc. which are visible to the user are level with the outer case of the device, then according to the impression given to the user it may be said that they are located "on the side surface".

Figure 5A:
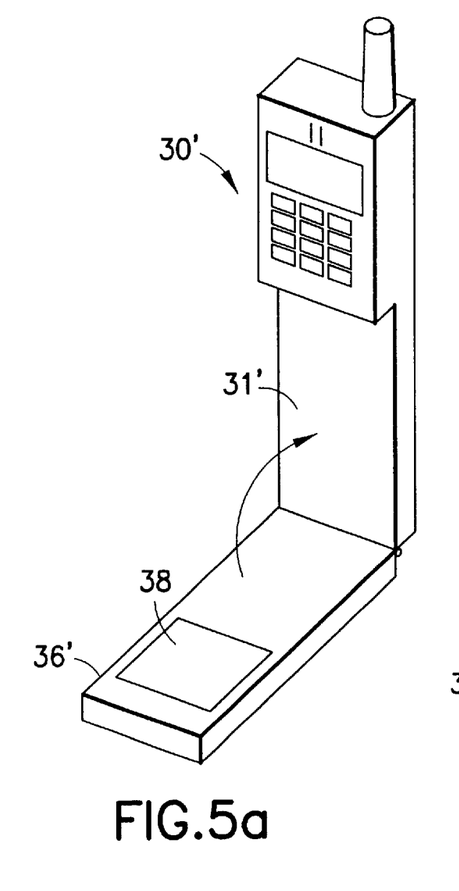
FIGS. 5a and 5b show some modifications of the structure shown in FIGS. 3a to 3d.
Figure 5B:
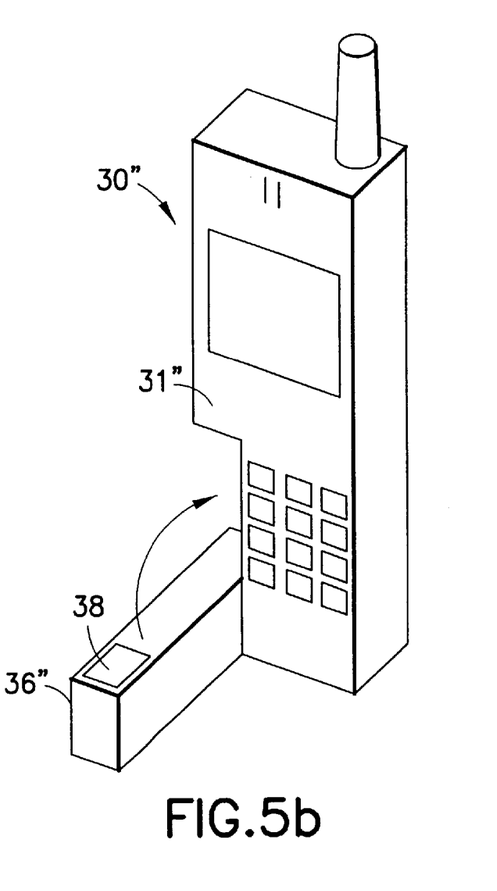

FIGS. 5a and 5b show some alternative structures which can be used to bring a display corresponding to the above presented display 38 into the user's field of vision during the use of the mobile station according to the invention. In the mobile station 30' of FIG. 5a the display part 36' is hinged to the frame part 31' in the same way as a cover flap which can be turned over the keyboard and which is used in many prior art mobile phones. The display 38 will come into view when the flap is opened. FIG. 5a illustrates with an arrow how the flap is closed. In FIG. 5b the display part 36" belonging to the telecommunication device 30" is turned out from the side of the frame part 31", whereby the display 38 comes into view. Again the turning of the display part 36" into the transport position is illustrated by an arrow. To a person skilled in the art it is evident that on the basis of the idea appearing in the FIGS. 3a to 3d and 5a and 5b also many other structures can be presented with which the relatively small-sized display can be made to reach the user's field of vision, even though he would hold the telecommunication device to one side of his head.

When the display located in the user's field of vision is switched on it consumes some amount of power, so it is not advisable to keep the display switched on when the user does not want to use it. If the display is located in a display part movable in relation to the frame part it is easy to mount a small-sized switch in the telecommunication device which switches on the display only when the display part is in the operating position. It is also easy to include in the display or in another location of the telecommunication device a switch which detects whether the user holds the telecommunication device at his left or right ear, and which, when required, electrically rotates the image displayed in the display in the user's field of vision 180 degrees around the centre of the image so that the user will see the image with the right side up. In order to electrically rotate the image displayed in the display into the desired position the telecommunication device can of course also include a manually operated switch. It is a known technique per se to rotate the image in the display, and in digital image processing it is most easily realised by changing the order in which the image data is read from the image memory where it is temporarily stored before it is transferred to the display.

Figure 6:
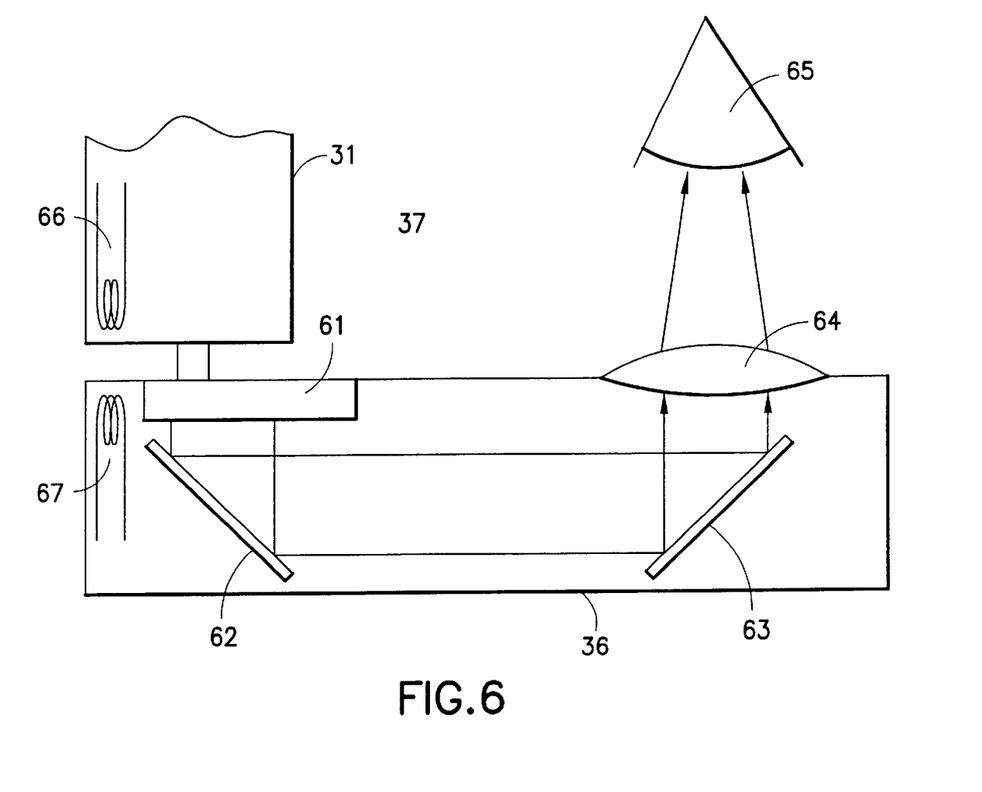
FIG. 6 shows in section the structure of the display part shown in the FIGS. 3a to 3d.

FIG. 6 shows in section an advantageous arrangement which in a telecommunication device according to the FIGS. 3a to 3d can be used to generate an image in the display in the user's field of vision. The display part 36 is fastened to the frame part 31 of the telecommunication device by a rotating joint 37. In the vicinity of the rotating joint within the display part 36 there is a small-sized electroluminescence display unit 61 known per se, which comprises for instance 640×200 picture elements or pixels. When a certain voltage distribution is supplied to the picture electrodes (not shown in the figure) located crosswise in the electroluminescence display unit 61 each pixel acts as an element which radiates light at a wavelength and with an intensity which depend on the momentary voltage of the picture electrodes. Pixels with different colours and intensities form a certain two-dimensional image. The light radiated by the pixels is reflected, in the manner shown by the broken arrow lines, from the mirrors 62 and 63 to the optics 64, which in FIG. 6 is represented by a simple biconvex lens, but which can comprise several different lenses in a row. In addition to the lenses and mirrors the optics can comprise also other optical elements, such as holography optics. The lenses and other optical elements belonging to the optics can also be located in other places within the display part 36, and the mirrors 62 and 63 can be optically polished, whereby they act as a part of the optics changing the passage of the light rays. Regardless of its structure and location in the display part 36 the purpose of the optics 64 is to direct the image generated by the electroluminescence display unit 61 to the user's eye 65 in such a form that when the display part according to the normal operating position is in front of the user's face, then the vision centre in the user's brains interprets the image information as if the display unit generating the image would be substantially larger than the electroluminescence display unit 61 and located at a few decimetres from the eye. Such optics are known per se, for instance from the patent publication U.S. Pat. No. 5,251,333 (Tsook) and from some of the reference publications mentioned there.

To a person skilled in the art it is evident that instead of the electroluminescence display unit it is also possible to use other small-sized display unit devices known per se in the structure according to the FIG. 6. The generation of an image with the display unit requires a little electrical energy, which has to be taken either from an own accumulator or battery (not shown in the figure) contained in the display part 36 or supplied to the display part from the frame part 31 of the telecommunication device. Further there must be a data transmission connection between the display part and the frame part. In order to prevent the display unit, the mirrors and the optics to become dirty the display part 36 is preferably tightly sealed, whereby one alternative to realise both the data transmission between the frame part 31 and the display part 36 as well as the transmission of electrical energy from the frame part 31 to the display part 36 is an inductive link known per se, which in FIG. 6 is formed by the schematically shown coils 66 and 67 close to each other. Instead of this it is of course possible to use a wiring where the feed-through of the wire through the case of the display part 36 is well sealed.

Figure 7A:
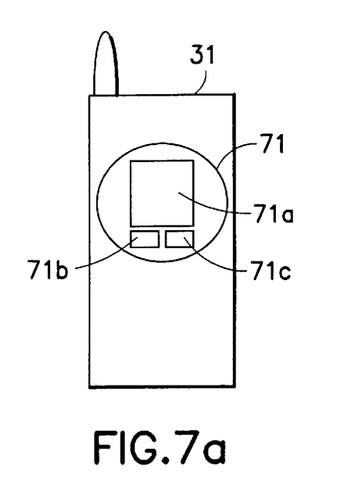
FIGS. 7a and 7b show some alternatives of the ball mouse shown in the FIGS. 3a to 3d.
Figure 7B:
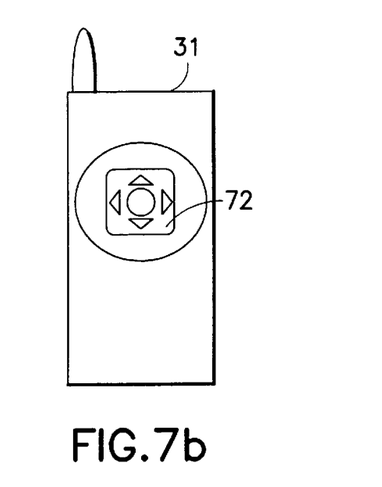

FIGS. 7a and 7b show some alternative control devices which can be used instead of the ball mouse shown in FIGS. 3a to 3d. FIG. 7a shows a touch pad mouse 71 in the back surface of the frame part 31 of the telecommunication device, where the user can move his finger on a touch sensitive area 71a, whereby the motion is transferred to the telecommunication device as a cursor motion instruction in the same way as a corresponding movement which rotates the tracker ball in the case of a ball mouse. On the sides of the touch sensitive area there are buttons 71b and 71c which correspond to the buttons 39b and 39c in FIG. 3c. The actual touch sensitive area can also comprise a weight sensor, whereby, when it is pressed harder than with a usual pressure it initiates the same function as a press of a separate button. FIG. 7b shows a navigation key 72 which the user can press at the edges or at the middle. A press at the edges communicates to the telecommunication device a cursor motion instruction and a press at the middle corresponds to a press of the button 39b or 71b. In addition to the control device alternatives shown in the FIGS. 3c, 7a and 7b it is possible to use other corresponding control devices known per se, which the user can operate by simple motions of one or more fingers.

Above it was said that a ball mouse or corresponding control device is located on the back surface of the frame part 31 of the telecommunication device. Regarding this definition it must be first said that the denomination "back surface" and other corresponding denominations referring to directions in this patent application are not limiting, but they only relate to the common position of telecommunication devices perceived by the user and presented in technical descriptions. Secondly the invention does not really limit the location of the components of the control device in the telecommunication device, so that the control device or some of its components can also be located at the sides, at the ends or on the front surface of the telecommunication device. However, regarding the invention it is advantageous to locate the control device or devices so that the user can use them as easily as possible without changing the common and socially accepted operating position according to FIG. 4.

In one embodiment of the invention the functions of the entire telecommunication device can be controlled by a ball mouse or a corresponding control device in a so versatile manner that the telecommunication device does not require a separate keyboard (reference numeral 34 in FIG. 3a) at all, or that the keyboard can comprise only a few keys which are used in addition to a ball mouse or a corresponding control device. For instance from the patent publications WO 93/14589 (Motorola Inc.) and EP 294 518 (The Laitram Corporation) there are known methods with which a telephone can be controlled with a mouse or with a device like a control switch, without any keyboard.

It also possible to incorporate into the telecommunication device a so called retinal scanning function, whereby the telecommunication device includes a device known per se which measures the motions of the user's eye. When the user's eye in this case is directed in different directions it can be interpreted as similar control instructions which normally are generated by a ball mouse or a corresponding device. One example of a control realised in this way is such where the display in the user's field of vision presents menu alternatives or graphical symbols, i.e. icons, representing different functions; when the user directs his eye to a certain menu alternative or on a certain icon the telecommunication device notices that the user wants to select the respective alternative or to initiate the function represented by the icon in question.

As mentioned above, the display which above was called the second display and shown in the FIGS. 3d, 4, 5a and 5b by the reference numeral 38 can also be the only display of the telecommunication device, or in other words, the prior art display 35 shown in FIG. 3a is not necessarily required at all. The information presented in the display 38 may vary greatly depending on which type of function is desired of the telecommunication device according to the invention. In a simple embodiment there is seen entirely or partly the same information as in the display of a prior art mobile phone, i.e. the battery charge status, the measured base station signal strength, the current operator, the character string when the telephone number or other character string is generated, the caller's telephone number when a call is received, and so on. In the display 38 the telecommunication device can also display menus with which the user can control the operation of the device. From the techniques of computers, mobile phones and digital television sets there are known numerous methods to realise menu operated user interfaces, so some of these methods can certainly be implemented in a telecommunication device according to the invention.

Figure 8:
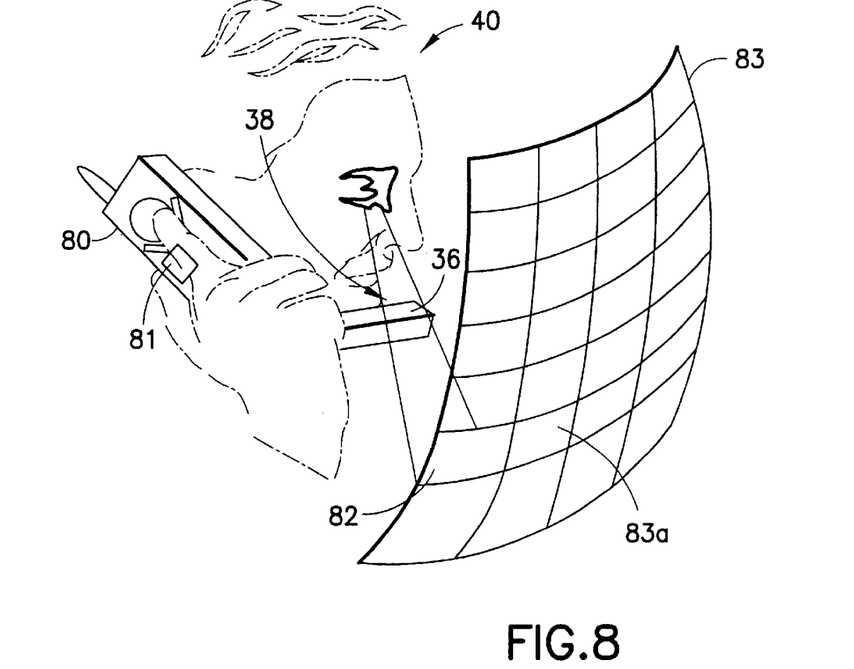
FIG. 8 shows a way to operate a telecommunication device according to a preferred embodiment of the invention.

FIG. 8 shows one advantageous way to utilise the display belonging to the telecommunication device according to the invention. The telecommunication device 80 has a display part 36 as presented above, which in the operating position according to the figure brings the display 38 into the field of vision of the user 40. The telecommunication device has also an inertia sensor 81 known per se, or any other sensor providing information about the absolute and/or relative position. An inertia sensor is substantially a device which measures the acceleration and which detects changes in the position and motion states of the telecommunication device 80, particularly the rotation in a three-dimensional space around the different rotation axes. The square 82 displayed in front of the user represents an area where the image presented by the display 38 seems to be as seen from the user's viewpoint (thanks to the operation of the optics included in the display part 36 and the vision centre in the brains of the user 40 the user perceives a so called pseudo image). It is conceivable that said pseudo image is a certain part of a larger pseudo image, which in FIG. 8 is indicated by the reference numeral 83. The larger pseudo image 83 exists only as calculated values in the image memory (not separately shown in the figure) included in the telecommunication device 80.

When the user his head he moves at the same time moves the telecommunication device 80, because for him it is natural to keep the telecommunication device the whole time in the same position in relation to his ear and eye. The inertia sensor 81 detects changes in the position and/or in the motion state of the telecommunication device and converts it into display control instructions which bring a new part of the larger pseudo image 83 into the display. The sliding of the image in the display is called panning. Thus, if the user turns his head for instance to the left, then the image in the display 38 is panned to the left, and so on. Due to the co-operation of the senses of sight, balance and motion the visual perception obtained by the user is the same as if there would be a mainly stationary pseudo image 83 in front of him, of which he sees only a small part 82 at a time. However, by turning his head (actually by turning/rotating the telecommunication device 80) he can pan the part seen by him into different directions whereby he will always see the desired part of the pseudo image 83. FIG. 8 shows separately the square 83a seen by the user if he turns his head to the left by the width of one sector showed at one time in the display. It is also possible to present an embodiment where the user is given a possibility to change the scale of the image seen by him, in other words to zoom the image, whereby he for instance can either see the entire pseudo image 83 in the size of the square 82, or according to the FIG. 8 he can view a detail of the image. The zooming can be performed as a response to a control instruction given to the telecommunication device, or it may be connected to the use of the inertia sensor, whereby, when the user moves his head forward ("closer to the pseudo image 83") he will see a smaller part of the image more sharply, and when the user withdraws his head ("farther from the pseudo image 83") he will see a larger part of the image, but more inaccurately.

The display control arrangement according to FIG. 8 is useful, because in a way it gives a possibility to multiply the area of the "display" and the amount of information which it can take. The user can easily maintain his orientation when he reads the information contained in the large-sized invisible pseudo image as small visible parts at a time, because the movement of a small visible part to different parts of the invisible pseudo image is effected physically in the same way and causes the same sensations as when a person directs his eyes to different points of a large-sized picture in front of him in order to create an overall view of it. By calculation the invisible pseudo image can be generated even as a sphere surrounding the user, and the user will always see a certain part of it in the correct place disregarding into which direction he turns his head. Such a technique is as such known from the so called virtual helmets, where the user's entire physical field of vision is covered by electrical displays. In the inventive use one preferred embodiment is to create an invisible pseudo image, which is very low in the height direction and very wide in the horizontal direction and which the user can examine in its entirety by turning his head in the horizontal plane. Then it is possible to display for instance a long text message in the invisible pseudo image, and in order to read this message the user, by turning his head, moves the visible part of the image from the left to the right in relation to the invisible pseudo image.

Control of the display with the aid of an inertia sensor can as such be implemented also in prior art mobile phones. Then the mobile phone display acts as the visible part of the image. In order to pan the image in different directions the user holds the mobile phone in front of him so that the display of the mobile phone is directed towards his face, and moves the mobile phone back and forth along an imagined spherical shell having the centre in the user's eye. An inertia sensor within the mobile phone measures the motions of the mobile phone and converts the measurement results into display control instructions. An invisible pseudo image covers said imaginary spherical shell, or at least a part of it, whereby the user sees in the mobile phone's display always that part of the image, which is located at the location of the mobile phone's display.

The idea of an invisible pseudo image and the panning of a small visible part of it can be applied also without an inertia sensor if the telecommunication device contains a ball mouse or another control device in the manner described earlier. In the panning mode the display control instructions generated by the ball mouse or other control device are then interpreted so that they do not move the cursor in the display but they pan the entire image. However, then we loose the above mentioned advantage regarding the user maintaining his orientation, because the perception about the position of the user's head provided by the senses of balance and motion does not support the message which the eyes communicate about how the visible area of the image is located in different directions.

One advantageous application where it is possible to utilise the presentation of a large-sized image to the user with the aid of the above described pseudo image technique is the real time ordering and use of electrical maps. Let's assume that the user of the telecommunication device is in a city which is strange to him, and that he does not possess a map of the city. With his telecommunication device he can make a data call to the telephone number of the local map service, or he can use other data transmission services offered by the telecommunication device and the data transmission network in order to contact the map service, whereby, as a response to the contact, the map service transmits the city map in a digital form to the telecommunication device. The map is stored in the memory of the telecommunication device and with the aid of suitable image processing operations and the display 38 it is possible to form from the map an invisible pseudo image of which the user can examine a small visible part at a time in the manner shown in FIG. 8.

The information provided by the inertia sensor is relative, i.e. it only measures a position change from an initial position. In addition, or instead, the telecommunication device can contain another sensor which provides some kind of absolute location, position and/or motion information. For instance, for the above described map application the telecommunication device can contain a small-sized meter of the magnetic field or another meter of the absolute direction, whereby the meter acts as a compass, i.e. it tells to the telecommunication device in which position it is regarding the point of the compass. In the map application the telecommunication device can then automatically rotate the map visible in the display so that it is in the correct direction: if the information provided by the meter of the magnetic field indicates that the user looks to the north, then the map north in the map seen by him is rotated into the direction of his eyes, and so on. The telecommunication device can also include a GPS sensor (Global Positioning System) or some other positioning means providing location information which can be displayed to the user in the display. If the user views a map with the aid of the display and the map contains information about a co-ordinate system which relates the region presented in the map with the global co-ordinate system, then the location information provided by the positioning means can be presented graphically in the map viewed by the user, for instance as a point which indicates the user's current location on the map.

Figures 9A, 9B:
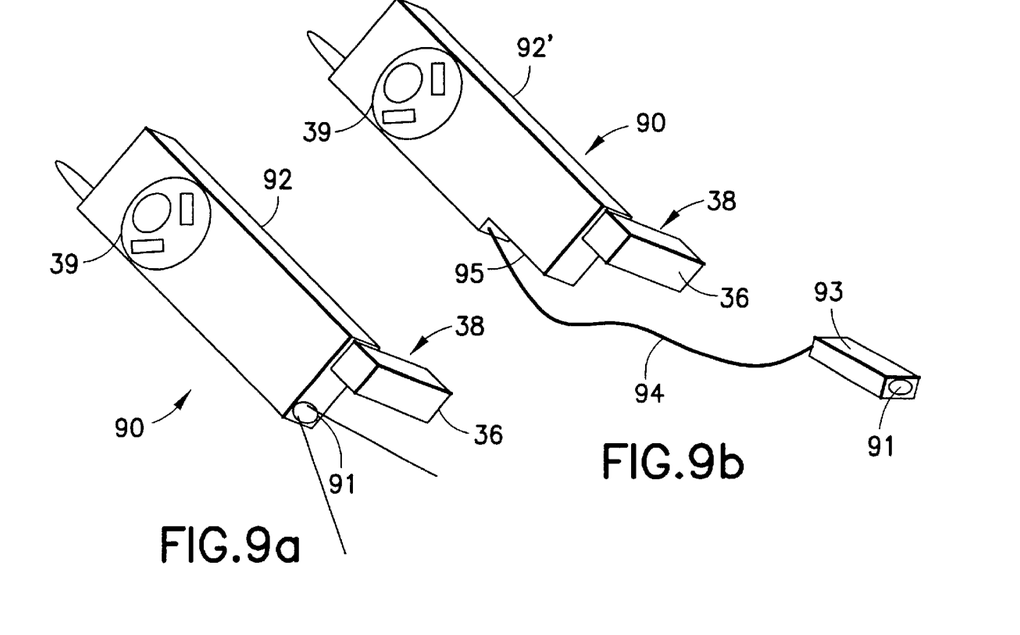
FIGS. 9a and 9b show some ways to connect a camera to a telecommunication device according to the invention.

The FIGS. 9a and 9b show a second embodiment of the invention where the telecommunication device 90 also contains an electrical camera 91. In the FIGS. 9a and 9b the telecommunication device is shown substantially in the same position as in the FIGS. 4 and 8 illustrating its use. In the embodiment of FIG. 9a the camera 91 is mounted as a fixed part of the frame part 92 in the same end of the frame part as the display part 36, and the direction of the camera's photographing sector, which is defined by the broken lines, is parallel with the longitudinal axis of the substantially elongated frame part; in the FIG. 9a the direction is slanting downwards. When the telecommunication device is next to the user's head and the user views the image shown in the display 38, then the photographing direction of the camera 91 is substantially parallel with the direction into which the user is looking. Because the user's eye is directed among other things to the display 38, the direction of the user's eye can be characterised so that it is opposite to the displaying direction of the display 38. Thereby the displaying direction means that direction in which the image, which is generated by the display and any optics related to it, is reflected in such a form that it is viewable by the user. Actually the user can view the image generated by the display 38 even if the displaying direction of the display would not be opposite to the direction of the user's eye, but the visual quality of the image generated by most displays is best when the displaying direction is exactly opposite to the direction of the user's eye. In the embodiment of FIG. 9b the camera 91 is mounted in a separate camera part 93, which when required can be fastened to the frame part 92' by a detachable joint at the fastening point 95, whereby the joint can be a mechanical and/or a magnetic quick coupling known per se. The camera part 93 and the frame part 92' are connected by a data transmission cable 94, for which there is a reserved space within the frame part 92': when the camera part 93 is fastened to the frame part 92' the transmission cable 94 is hidden within the frame part 92'. Any data transmission link known per se, including infrared links and other short range wireless links may be used instead of the transmission cable or in addition to it.

The result according to FIG. 9b is also obtained with an arrangement where the telecommunication device according to the invention does not actually contain a camera, but to which a digital still camera, a video camera or some other electronic image source known per se can be connected by a separate cable or some other data transmission link. Then the user could view in the display images generated by an external camera or another electronic image source and/or transmit them to a receiver by utilizing the data transmission features of the telecommunication device and the data transmission network.

The use of a camera can be combined in many ways with the other use of the telecommunication device according to the invention. One alternative is to use the camera and the telecommunication device to transmit still pictures or "electrical post cards". The user directs the camera 91 to the desired target and enters an instruction, for instance by pressing the buttons of the ball mouse 39, whereby an image of the target is stored in the memory of the telecommunication device via the camera and image processing circuits related to the camera. This can be made in the middle of a call or before the call is initiated; the user calls the desired number and uses the data transmission features of the telecommunication device and the data transmission network in order to transfer the stored digital photograph to the telecommunication device, telefax terminal or computer of the desired receiver. Together with the image the telecommunication device can also automatically transmit to the receiver information about the sender of the photograph, and/or the user can write with his telecommunication device a message in character form which is then transmitted to the receiver together with the image. If the transmission capacity of the telecommunication device and the data transmission network is sufficiently high it is possible to transmit to the receiver a video stream comprising several consecutive images, in the same manner as in known video conference systems. As an arrangement this differs from transferring still pictures only in that when the video stream mode is started, then instead of one image the telecommunication device automatically stores and transmits consecutive images until the user quits using the video stream mode, until the connection to the data transmission network is interrupted, or until the power supply of the device is exhausted.

In the normal operating position of a telecommunication device according to FIG. 9a the photographing direction of the camera 91 is away from the user, so that the still pictures or the video stream of the video conference type taken by the user generally represent something else than the user himself. This arrangement differs from many known video conference applications where the express object is to transfer an image of the speaker or speakers. However, the user can of course place himself in front of a mirror, whereby he photographs himself with the aid of the mirror. For this purpose it is even possible to deliver to the user a separate mirror as an accessory of the telecommunication device. In the embodiment of FIG. 9b the user can freely select the object to be photographed. The embodiment of FIG. 9a is more advantageous regarding the maintenance of the telecommunication device, because when the display part 36 is turned into the transport position it covers the lens of the camera 91 and protects it from blows and wear.

The display 38 is advantageously used as an aid when the camera 91 is used for photographing. The image generated by the camera 91 can be supplied in real time by the telecommunication device 91 into the display 38, whereby the display 38 acts as a viewfinder of the camera 91 and the user can easily aim the image at the desired target. If the telecommunication device is used for video conference, where images are transmitted in both directions, the display 38 can of course also be used to display to the user the "return direction" image arriving at the telecommunication device from the data transmission network. The display may even be divided so that it displays both the outgoing and the incoming images simultaneously, or the outgoing and the incoming images can alternate in the display.

The simultaneous transmission of an image, representing some other object than the user, together with a usual call is particularly useful e.g. for maintenance men who must operate on their own and far away from technical specialists. Let's assume that the user of a telecommunication device according to the invention is a maintenance man who has been sent to repair a fault which occurred in a machine on the customer's premises. If the maintenance man himself is not able to find the cause of the fault he can call a technical specialist having at his disposal a similar telecommunication device or some other arrangement for simultaneous reception of voice and image. The maintenance man directs his camera to the object to be repaired, and at the same time he describes verbally what he sees. The voice and the image are transmitted practically in real time to the specialist who then can ask the maintenance man to direct the camera in some other manner or to describe some particular detail verbally and/or with the aid of the camera. If the specialist recognises the cause of the fault he can give verbal instructions for the repair of the fault and/or transmit the repair instructions as a text and/or an image file to the telecommunication device of the maintenance man, whereby the telecommunication device stores the file and presents it to the maintenance man for instance with the aid of the pseudo image technique described earlier.

A digital camera which is included in the telecommunication device, or which can be connected to it as an accessory, can also act at some other wavelength range than that of visible light. For instance an infrared camera can generate an image of a target also in darkness. In addition to a different wavelength the camera and/or the image processing circuits known per se can include other features which make the image different from an image seen with the naked eye. This feature can be used in order to create an application of the so called augmented reality type. Augmented reality means that the image perceived by the user represents exactly the same object which the user would see also otherwise in the respective point in his field of vision, but the image includes such features describing the object which would be difficult or impossible to perceive with the naked eye. If for instance the image generating camera is more sensitive to light than the human eye, then the arrangement acts as a photomultiplier, i.e. the user perceives that part of his field of vision presented by the image as better illuminated than seen with the naked eye. In another example the internal structure of a mechanical object can be stored in the telecommunication device, whereby when the user looks at said object with the aid of the camera and display belonging to the telecommunication device he will in addition to the object's exterior see the contours of its internal parts which the telecommunication device presents in the display.

Figure 10:
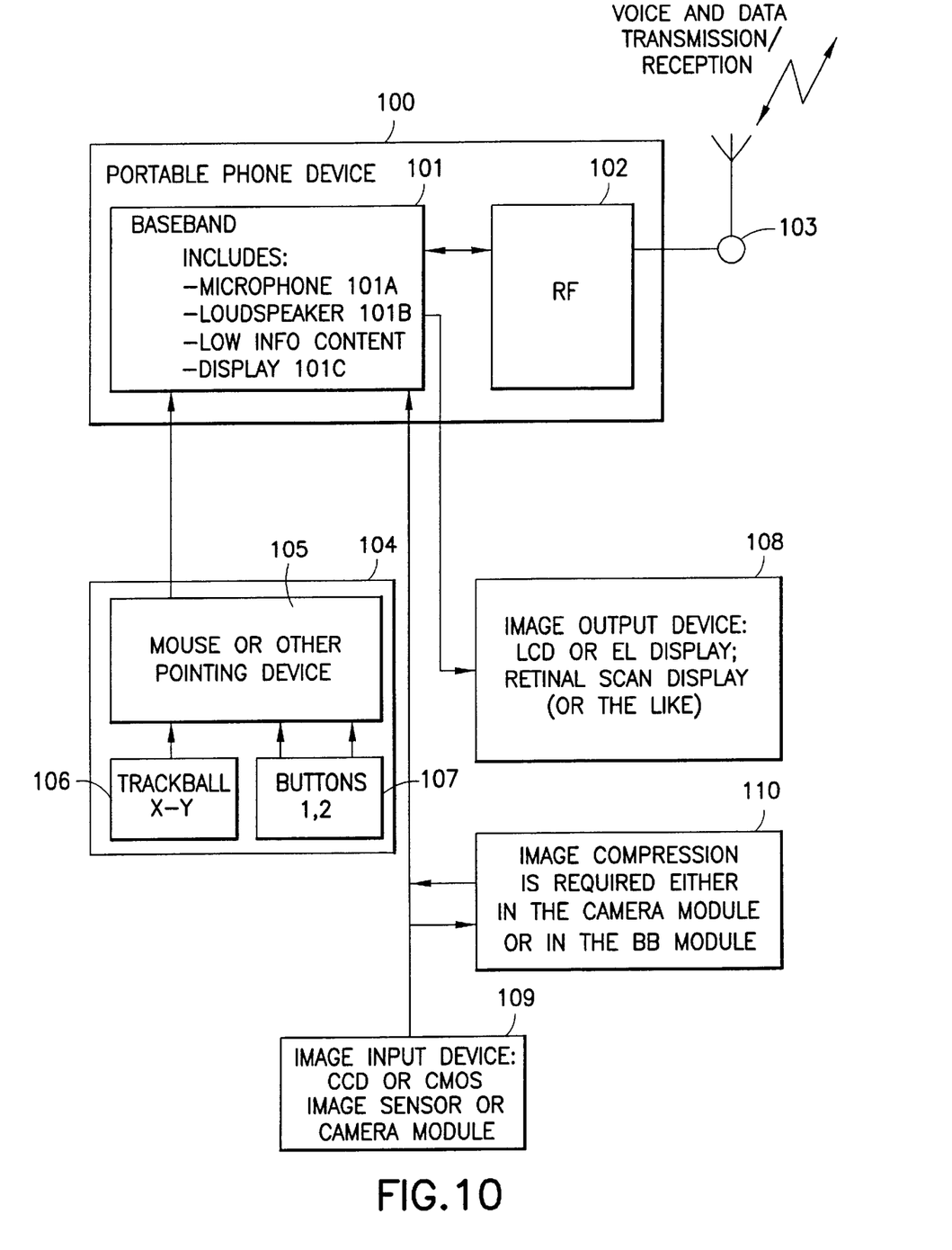
FIG. 10 shows a block diagram of a telecommunication device of a preferred embodiment of the invention.

FIG. 10 is a block diagram which illustrates the functional structure of an embodiment of a telecommunication device according to the invention. In this case the telecommunication device includes a ball mouse according to FIG. 3c, a display which in the operating position is brought into the user's field of vision, and a camera. The block 100 corresponds functionally to a known mobile phone which has a baseband block 101 and a radio frequency block 102 in direct data transmission connection with the baseband block. The baseband block 101 contains among other things a microphone 101a, a speaker 101b and a display 101c, which is typically a liquid crystal display of the dot matrix type in order to present to the user character strings and symbols relating to the operation of the device. Further the baseband block 101 contains all those signal processing sections which are required to convert the speech recorded by the microphone 101a into an electrical form and to supply it to the radio frequency block 102 for transmission, and also those signal processing sections which are required for processing the transmissions received by the radio frequency section 102 and converting them into an acoustic signal with the aid of the speaker 101b or into visual messages with the aid of the display 101c. For the sake of graphical clarity these sections are not shown in FIG. 10. The baseband section 101 further contains at least one microprocessor for controlling the operation of the telecommunication device; for the sake of clarity the microprocessor is neither shown in FIG. 10. The radio frequency block 102 contains chiefly different amplifiers, filters and mixers in order to generate and amplify desirable radio frequency signals and to attenuate undesirable signals. The radio frequency block 102 has a direct connection to the antenna 103 of the telecommunication device. The block 100 contains also a memory, a battery or other power source, mechanical support structures, and all other such components known per se which are needed in a common mobile phone.

In the embodiment of FIG. 10 the ball mouse block 104 contains a tracker ball 106, buttons 107, and a data acquisition section 105 which converts the motions of the tracker ball 106 and the presses of the buttons 107 into electrical signals, which are supplied to the baseband block 101. The internal structure of the block 104 is not essential for the invention, which means that the ball mouse can be replaced by any other control device which generates substantially similar electrical signals and which can be integrated into a relatively small-sized mobile phone. The baseband block generates an image which is intended to be displayed in the user's field of vision and directs it on the data transmission connection to the display 108. The camera or a corresponding image generating unit forms a block 109 of its own, from which there is a data transmission connection with a relatively high capacity to the baseband block 101. Common CCD elements (Charge Coupled Device) and corresponding rapidly readable image generating components can generate a large amount of image information which must be compressed in the block 110 in order to save capacity. It is here shown as a separate block, but it can also be a fixed part of either the camera block 109 or the baseband block 101.

Figure 11:
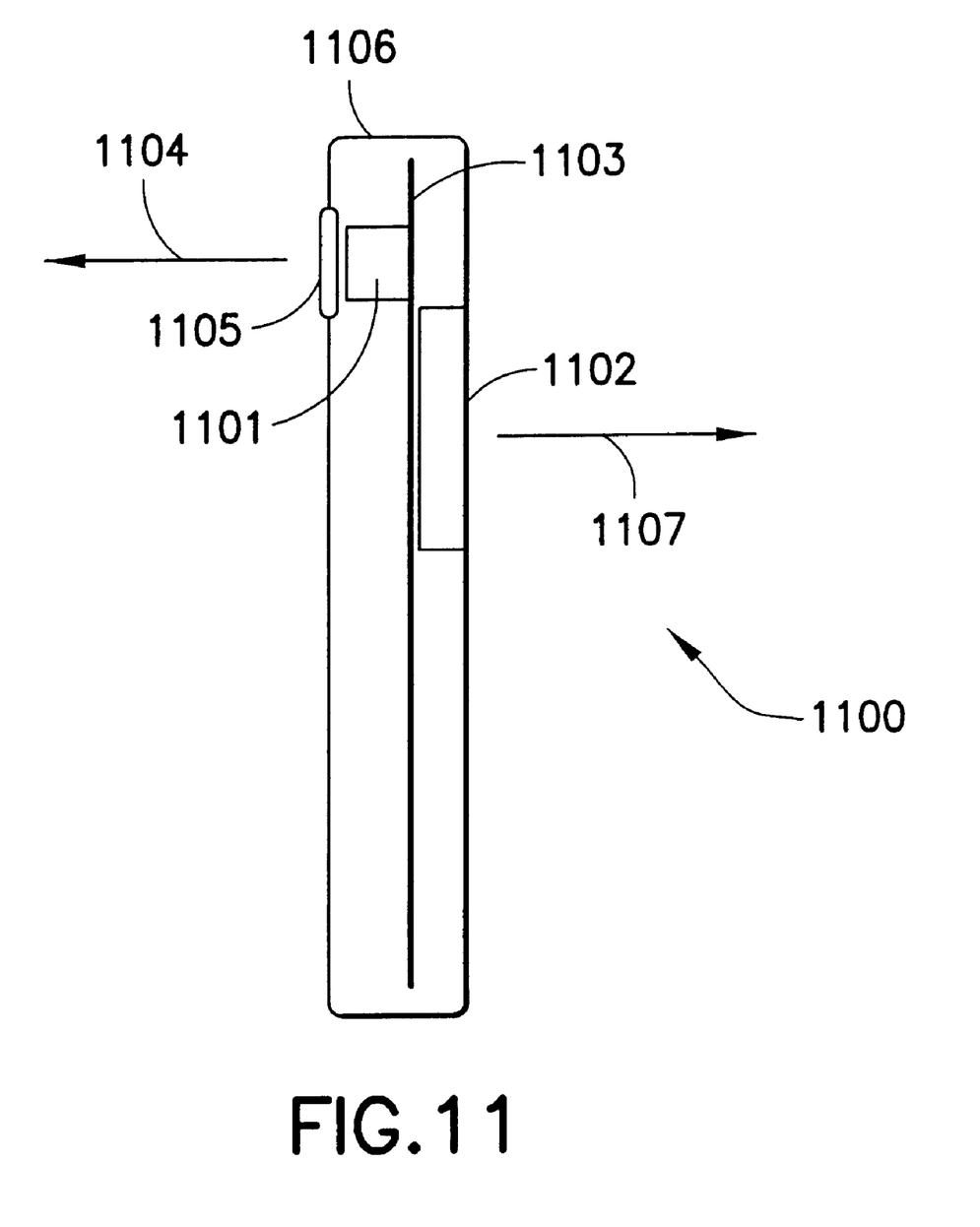
FIG. 11 shows the structure of a telecommunication device according to a second preferred embodiment of the invention.

FIG. 11 shows in a section a third embodiment of the invention. Also in this embodiment the telecommunication device 1100 comprises a camera 1101. Further the telecommunication device comprises a display 1102 which in this case is arranged substantially in the same way as the display of a prior art mobile phone (cf. the display 14 in FIG. 1). On the same side of the telecommunication device as the display 1102 there can be a microphone, a speaker and a keyboard as well as other parts which are important regarding the use of a mobile phone, but which are not separately shown in FIG. 11. The reference numeral 1103 denominates a printed circuit board which forms the basic structure of the electrical components of the telecommunication device. Here it is assumed that the telecommunication device comprises only one printed circuit board, but the telecommunication device could as well comprise several printed circuit boards. The camera 1101 and the display 1102 are placed on different sides regarding the printed circuit board 1103 and/or regarding other printed circuit boards substantially parallel with it. The camera and the display can be fastened to the printed circuit board, or a wiring or some other electrical arrangement can be used between them and the printed circuit board in order to transfer the operating voltage and information.

The camera 1101 photographs in the direction shown by the arrow 1104 through an opening or window 1105 in the case of the telecommunication device. At the same time the window 1105 can act as a filter which does not pass infrared light, ultraviolet light and/or radiation at some other such wavelength which would impede the generation of an image in the camera 1101. The window/filter 1105 can be connected directly or via some mechanical adapter, for instance an elastic fastening ring, to the case 1106 of the telecommunication device. The window/filter 1105 acts also as a shield which prevents the lenses or other optical components (not separately shown in the figure) belonging to the camera 1101 from being scratched and getting dusty. A similar window/filter arrangement can be applied also in other earlier presented cameras integrated in a telecommunication device according to the invention. The displaying direction of the display 1102 is shown by the arrow 1107.

In the embodiment according to FIG. 11 the operation of the camera 1101 and display 1102 is advantageously arranged so that the user can use the display 1102 as a viewfinder of the camera 1101. Then the above mentioned socially acceptable operating position is obtained: a user which uses the camera 1101 in order to photograph an object and who views the image taken by the camera 1101 in the display 1102 will appear like a user, who reads a text message in the display of a prior art mobile phone or who views other information displayed in the display of a prior art mobile phone. Further all such advantages are attained which were described above with reference to the fact that the photographing direction of the camera is the same as the direction of the user's eye. The features of the embodiment shown in FIG. 11 can of course be combined in many ways with the features of the other embodiments of the invention presented above.

Above it was stated that the image information generated by a camera relating to a telecommunication device according to the invention can be supplied to a display in the telecommunication device, whereby the display can be used as a viewfinder of the camera. In many telecommunication devices of the mobile phone type the display is black and white and is not able to display very many hues, while many such small CCD elements (Charge Coupled Device) which can be used as image generating units of the camera included in the telecommunication device are able to generate at least hue information and often even colour information. Despite this the display can be used as the viewfinder of the camera in such a manner that a simple image is formed from the image information by a filtering operation known per se, so that this image contains only one colour and a few or no hues, and this image is then supplied to the telecommunication device's own display. If the capacity of the data transmission link between the telecommunication device and the outside world is low, then the simple image might also be that image which is transmitted, but particularly in telecommunication devices operating in future mobile networks the image to be transmitted can have a considerably higher quality than the image presented in the display; it can in other words contain more information regarding colours, hues and/or other image information.

To a person skilled in the art it is evident that the above presented embodiments are exemplary and do not limit the invention. The parts of the telecommunication device presented in the description can be combined in different ways, or some of the parts can be omitted without deviating from the scope of the claims presented below.

What is claimed is:

1. A mobile telecommunication device (30), which has an elongated form and comprises a first end, a second end, a speaker (32) and a microphone (33), of which said speaker (32) is located in that part of the telecommunication device which is at said first end and said microphone (33) is located in that part of the telecommunication device which is at the second end and the location of the speaker and microphone is so dimensioned that in a normal operational position of said telecommunication device on the side of the head of a human user said speaker is next to the ear of the user and said microphone is close to the mouth area of the user; said telecommunication device further comprising a camera (91, 1101) having a certain photographing direction and a display (38, 1102) having a certain displaying direction, characterised in that said display (38, 1102) is arranged to be located in the field of vision of the user in said normal operational position on the side of the head of the user, and said camera (91, 1101) is coupled to said telecommunication device so that said photographing direction in said normal operational position on the side of the head of the user is substantially in the same direction in which the user is looking, said direction being opposite to said displaying direction.

2. A telecommunication device according to claim 1, characterised in that the camera is fixedly contained in the telecommunication device.

3. A telecommunication device according to claim 1, characterised in that the camera is located in a camera part (93), which can be mechanically connected to the telecommunication device with the aid of a detachable connection.

4. A telecommunication device according to claim 1, characterised in that it comprises means (101) for directing the image generated by said camera to said display (38, 108).

5. A telecommunication device according to claim 1, characterised in that it comprises a frame part (31) and a display part (36) which are movable in relation to each other, whereby said display (38) is located in said display part (36) and said speaker (32) is located in said frame part (31).

6. A telecommunication device according to claim 5, characterised in that said display part (36) is connected to said frame part (31) by a rotating joint (37), in relation to which the display pan can be rotated between two extreme positions, of which in the first extreme position it acts as an extension of the frame part so that the direction of the external surfaces of the display pan does not essentially deviate from the direction of the external surfaces of the frame part, and in the second extreme position the display part is directed in a lateral direction which is substantially perpendicular to the direction of the maximum dimension of the frame part.

7. A telecommunication device according to claim 5, characterised in that the display part (36) contains a display element (61) for generating an image and optics (64) for directing the image into the user's field of vision so that the user perceives the image to be larger than in reality and farther away than in reality.

8. A telecommunication device according to claim 1, characterised in that it comprises means for rotating the image displayed in said display by 180 degrees around the centre of the image as a response to information about the position of the telecommunication device in relation to the user's head, and means for generating said information with the aid of a switch, which is one the following: an automatic switch, a manual switch.

9. A telecommunication device according to claim 1, characterised in that said camera is arranged to operate at another wavelength range than that of visible light.

10. A telecommunication device according to claim 9, characterised in that it further comprises means for illuminating an object to be photographed at said other wavelength range than that of visible light.

11. A telecommunication device according to claim 1, characterised in that it comprises means (101) for displaying in said display (38, 108) other graphical information than the image generated by said camera, simultaneously and superimposed on the image generated by said camera.

12. A telecommunication device according to claim 1, characterised in that it comprises means (110, 101, 102, 103) for transmitting the image generated by said camera in an electrical form via a data transmission network to a receiver, whereby said electrical form is one of the following: a still picture file, a continuous video stream.

13. A telecommunication device according to claim 1, characterised in that it further comprises a meter of the magnetic field in order to convey via said display to the user information relating to the position of the telecommunication device regarding the points of the compass.

14. A telecommunication device according to claim 1, characterised in that it further comprises a control device (39, 71, 72, 81) for generating display control instructions on the basis of a mechanical motion made by the user.

15. A telecommunication device according to claim 14, characterised in that in order to generate display control instructions on the basis of such a motion where the user moves a certain part of his hand in relation to the telecommunication device said control device is one of the following: a ball mouse (39), a touch pad mouse (71), a navigation key (72).

16. A telecommunication device according to claim 15, characterised in that said telecommunication device has a flat form, defining a first wide side surface and a second wide side surface opposite each other, and said control device (39, 71, 72) is located on said wide second side surface in that part of the telecommunication device which is at said first end.

17. A telecommunication device according to claim 14, characterised in that in order to generate display control instructions on the basis of such a motion where the user moves the entire telecommunication device said control device is a device measuring the rotation around at least one axis, particularly an inertia sensor (81).

18. A telecommunication device according to claim 17, characterised in that it comprises means to generate by calculation an invisible pseudo image (83) and to display a certain part (82, 83a) of said invisible pseudo image in said display on the basis of the measuring results which are provided by said inertia sensor (81) and which represent the position and that motion state of the telecommunication device.

* * * * *